United States Patent
Moroo et al.

(10) Patent No.: US 7,634,105 B2
(45) Date of Patent: Dec. 15, 2009

(54) METHOD AND APPARATUS FOR EMBEDDING INFORMATION IN IMAGED DATA, PRINTED MATERIAL, AND COMPUTER PRODUCT

(75) Inventors: Jun Moroo, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 11/290,989

(22) Filed: Dec. 1, 2005

(65) Prior Publication Data

US 2007/0047759 A1   Mar. 1, 2007

(30) Foreign Application Priority Data

Aug. 30, 2005   (JP) .............................. 2005-249105

(51) Int. Cl.
*G06K 9/00*   (2006.01)
(52) U.S. Cl. ....................... 382/100; 713/176
(58) Field of Classification Search ................. 382/100, 382/232; 380/210, 252, 287, 54; 713/176; 704/200.1, 273; 381/73.1; 348/460, 463
See application file for complete search history.

(56) References Cited

U.S. PATENT DOCUMENTS

| | | | | |
|---|---|---|---|---|
| 5,659,726 A | * | 8/1997 | Sandford et al. | 707/101 |
| 5,721,788 A | * | 2/1998 | Powell et al. | 382/100 |
| 5,809,160 A | * | 9/1998 | Powell et al. | 382/100 |
| 6,049,627 A | * | 4/2000 | Becker et al. | 382/181 |
| 6,128,736 A | | 10/2000 | Miller | |
| 6,137,892 A | * | 10/2000 | Powell et al. | 382/100 |
| 6,154,571 A | | 11/2000 | Cox et al. | |
| 6,901,515 B1 | * | 5/2005 | Muratani et al. | 713/176 |
| 7,280,701 B2 | * | 10/2007 | Moroo et al. | 382/239 |
| 2002/0106105 A1 | | 8/2002 | Pelly et al. | |
| 2004/0234139 A1 | | 11/2004 | Moroo et al. | |
| 2005/0117774 A1 | * | 6/2005 | Moroo et al. | 382/100 |

FOREIGN PATENT DOCUMENTS

| | | |
|---|---|---|
| EP | 1 480 163 | 11/2004 |
| EP | 1 536 629 | 6/2005 |
| EP | 1 768 376 | 3/2007 |
| EP | 1 775 931 | 4/2007 |
| EP | 1 775 932 | 4/2007 |
| EP | 1 780 670 | 5/2007 |
| JP | 2000-138818 | 5/2000 |
| JP | 2001-061055 | 3/2001 |
| JP | 2002-271612 | 9/2002 |
| JP | 2002-533961 | 10/2002 |

(Continued)

OTHER PUBLICATIONS

Office Action issued in corresponding Japanese Patent Application No. 2005-249105, mailed on Feb. 5, 2008.

(Continued)

*Primary Examiner*—Anand Bhatnagar
(74) *Attorney, Agent, or Firm*—Fujitsu Patent Center

(57) ABSTRACT

In an information embedding apparatus, an image selecting unit selects original image data from an original image data group, a decoder detects a code from the selected original image data, and a candidate code determining unit calculates a candidate code. A candidate code embedding unit embeds the candidate code in the selected original image data.

12 Claims, 11 Drawing Sheets

FOREIGN PATENT DOCUMENTS

| | | |
|---|---|---|
| JP | 2002-344720 | 11/2002 |
| JP | 2004-349879 | 12/2004 |
| JP | 2005-026848 | 1/2005 |
| JP | 2005-117154 | 4/2005 |
| JP | 2005-229508 | 8/2005 |

OTHER PUBLICATIONS

Extended European Search Report issued in corresponding European Patent Application No. 05257318.5, on Oct. 26, 2007.

Japanese Office Action issued on Oct. 23, 2007 in corresponding Japanese Patent Application No. 2005-249105.

* cited by examiner

FIG.4
 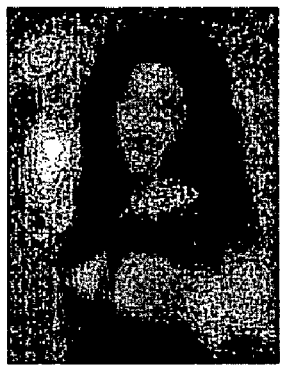 
ORIGINAL IMAGE    BLURRING    FRAMING

FIG.11
ORIGINAL IMAGE
IMAGE AFTER
CHANGING TONE
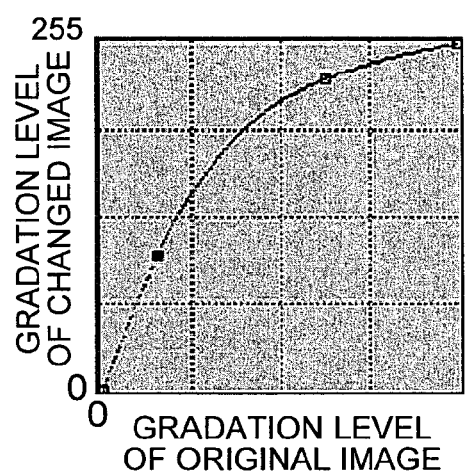

METHOD AND APPARATUS FOR EMBEDDING INFORMATION IN IMAGED DATA, PRINTED MATERIAL, AND COMPUTER PRODUCT

BACKGROUND OF THE INVENTION

1. Field of the Invention

The present invention relates to a technology for embedding information in image data. More specifically, the invention relates to a technology for embedding information regardless of the characteristic of the image data.

2. Description of the Related Art

Invisible information, for example, watermarks, are sometimes embedded in digital data and/or when printing images. A watermark is embedded to prevent forgery or illegal use of data or images. The watermark can be embedded in an image by changing or adjusting a gray value of an image area where the information is to be embedded.

Japanese Patent Application Laid-open No. 2005-117154 discloses a technique in which an embedding algorithm is used to analyze an image in which information is to be embedded, and detect an area where information can be embedded and an area where information cannot be embedded, and information indicating that information is not embedded is embedded in the area where information cannot be embedded.

In the conventional art, however, depending on the characteristics of images, information cannot be embedded in some images.

SUMMARY OF THE INVENTION

It is an object of the present invention to at least solve the problems in the conventional technology.

According to an aspect of the present invention, an information embedding apparatus that embeds information in image data includes a code calculator that extracts a feature quantity from the image data, and calculates a code from extracted feature quantity; and an information embedding unit that changes the extracted feature quantity in accordance with calculated code and embeds the changed feature quantity in the image data.

According to another aspect of the present invention, an information embedding apparatus that embeds information in image data includes an acquisition unit that acquires a plurality of codes and an image data group; an extraction unit that extracts a feature quantity from each of the image data group, and extracts a combination of image data and a code, by which information can be easily embedded, based on the extracted feature quantities and the codes; and an information embedding unit that changes the feature quantity of the image data to be combined with the code so as to correspond to the code extracted by the extraction unit and embeds changed feature quantity in the image data.

According to still another aspect of the present invention, a method of embedding information in image data on a computer includes extracting a feature quantity from the image data; calculating a code from extracted feature quantity; and changing the extracted feature quantity in accordance with calculated code; and embedding the changed feature quantity in the image data.

According to still another aspect of the present invention, a computer-readable recording medium stores therein a computer program that implements a method according to the present invention on a computer.

According to still another aspect of the present invention, a printed material is printed with an image data embedded with information by an information embedding apparatus according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic for explaining the characteristics of an information embedding apparatus according to a second embodiment of the present invention;

FIG. 11 is a schematic for explaining the characteristics of an information embedding apparatus according to a fourth embodiment of the present invention.

DETAILED DESCRIPTION OF THE PREFERRED EMBODIMENTS

Exemplary embodiments of the present invention are explained next with reference to the accompanying drawings.

Figure 1A:
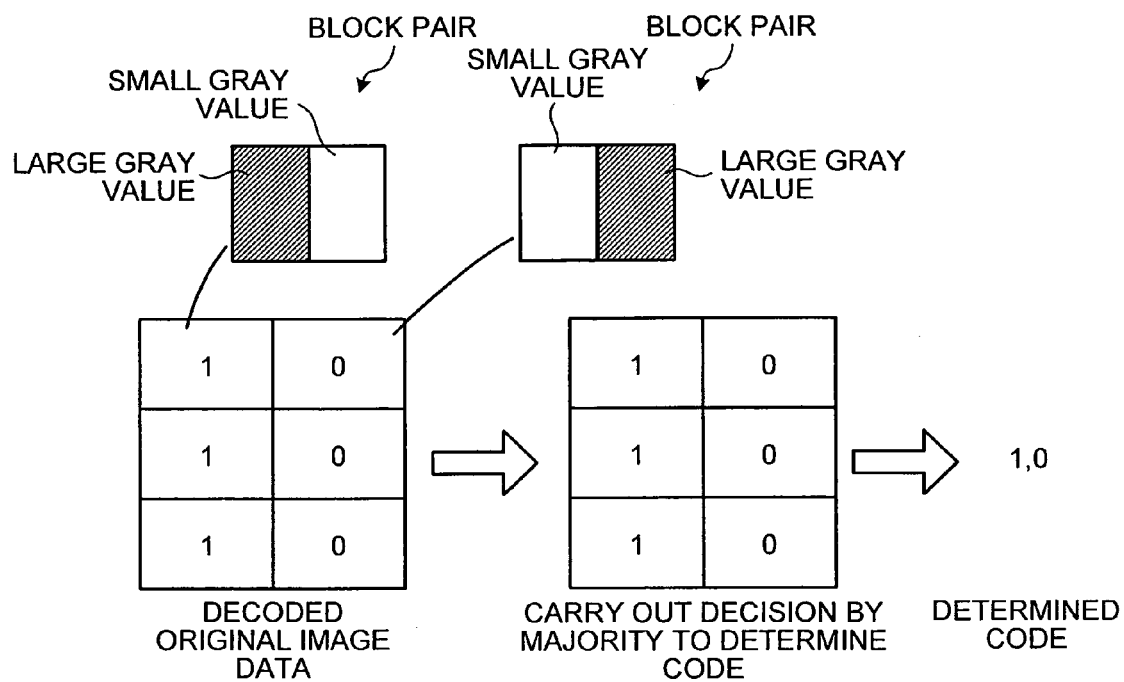
FIGS. 1A and 1B are schematics to explain the characteristics of an information embedding apparatus according to a first embodiment of the present invention.
Figure 1B:
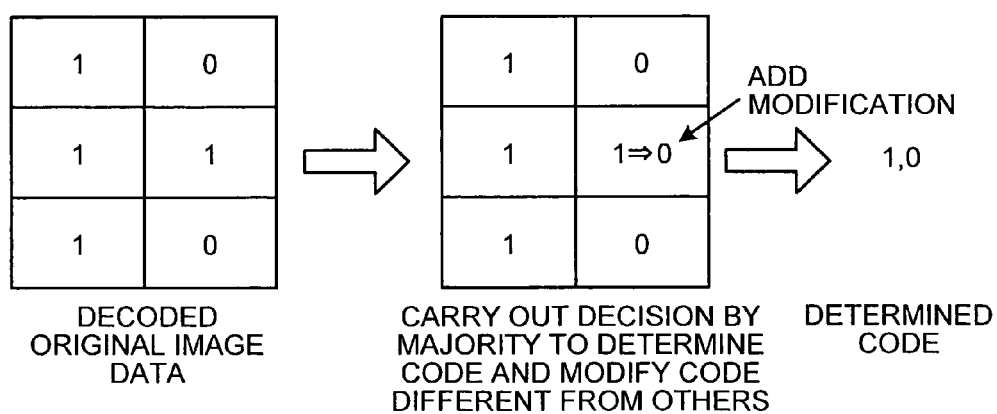

FIGS. 1A and 1B are schematics for explaining the characteristics of the information embedding apparatus according to the first embodiment. As shown in FIG. 1A, the information embedding apparatus decodes original image data having not subjected to image modification processing (hereinafter, "original image data"), to detect a pseudo code from the original image data. The information embedding apparatus calculates a code to be embedded in the original image data based on the pseudo code, and embeds the calculated code in the original image data.

As shown in FIG. 1A, the information embedding apparatus extracts a block pair (there are six block pairs in the example shown in FIG. 1A) from the original data and compares a gray value on the right and left sides of the block included in the block pair to detect the pseudo code. For example, when the gray value of the left block is larger than that of the right block, the pseudo code is "1", and when the gray value of the left block is equal to or smaller than that of the right block, the pseudo code is "0". Explanation here is given by using a mean gray value, which is a characteristic for differentiating the block pair, however, other characteristics, for example, granularity, color saturation, and density centroid or dispersion can be used.

In FIG. 1A, for the convenience of explanation, it is assumed that two-digit code is extracted from the original image data. The original image data is formed of six blocks (block pairs), and the two-digit code repeats three times, and can be extracted as a pseudo code. That is, for the original image data in FIG. 1A, pseudo coded 1, 0; 1, 0; and 1, 0 are extracted.

Decision by majority is made based on the code detected from the original image data, to calculate a code to be embedded in the original image data. In this case, since there is only one combination of 1 and 0, the code to be embedded in the original image data becomes "1, 0". In this case, the information embedding apparatus does nothing to the original image data.

Now assume the original image data shown in FIG. 1B. In this case, 1, 0; 1, 1; and 1, 0 are detected as pseudo codes. Therefore, in the decision by majority, since there are two 1, 0, and only one 1, 1, the code to be embedded in the original image data becomes "1, 0". The information embedding apparatus changes the pseudo code 1, 1 to 1, 0. Specifically, changes the mean gray value of the corresponding block. In this case, as shown in FIG. 1B, since it is necessary to change 1 to 0, the magnitude correlation of the mean gray value of the block pair is reversed, so that 0 can be detected).

Subsequently, the information embedding apparatus decodes the image data acquired by changing the original image data. (hereinafter, simply "image data") again, to determine whether the code is properly embedded. When the code is correctly embedded, the image data including the code embedded therein is output.

Thus, the information embedding apparatus decodes the original image data, calculates a code having good compatibility with the original image data, and embeds the calculated code in the original image data. Accordingly, the code can be efficiently embedded in the original image data. The code embedded in the original image data is banded with various kinds of information by a manager and used.

Figure 2:
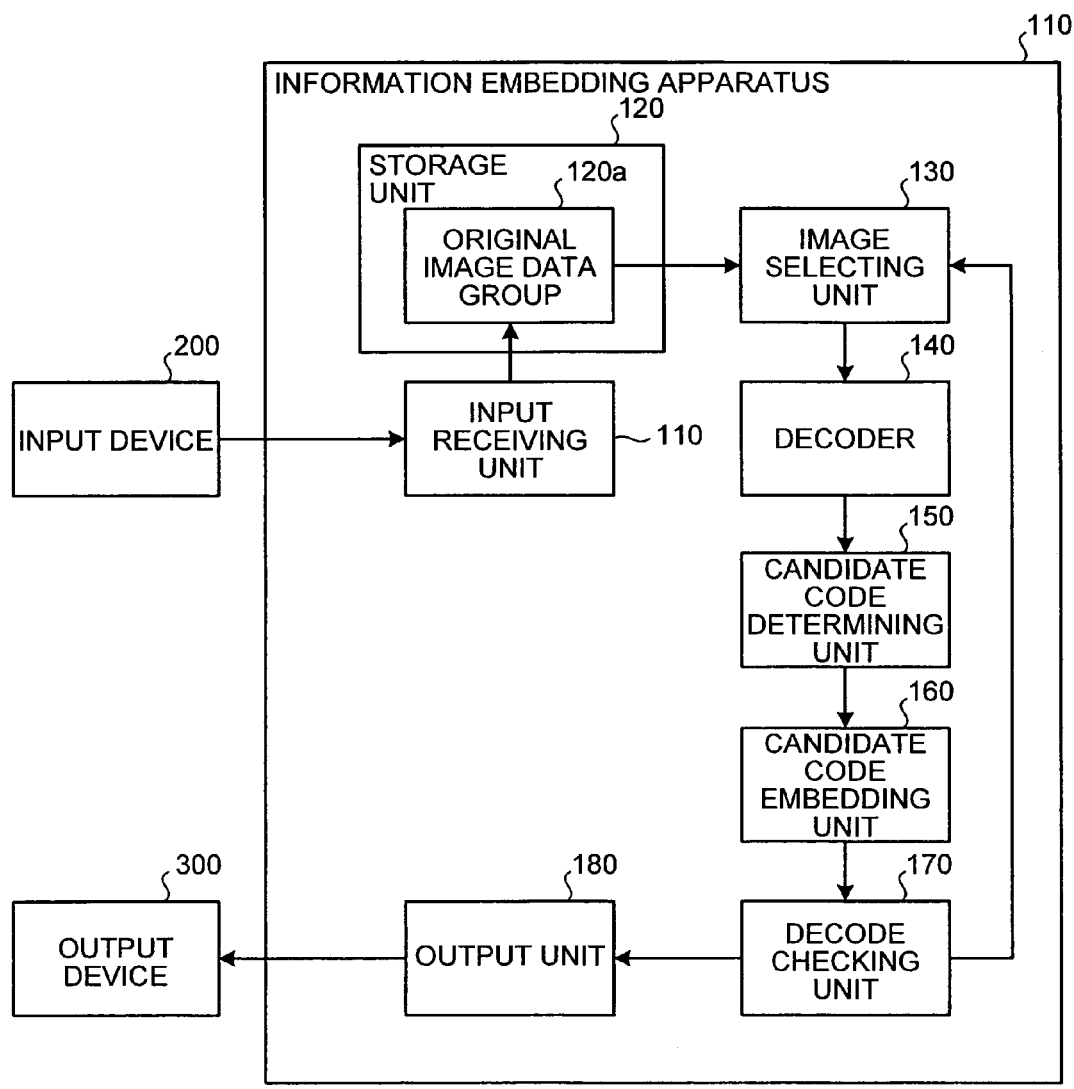
FIG. 2 is a functional block diagram of the information embedding apparatus according to the first embodiment.

FIG. 2 is a functional block diagram of the information embedding apparatus according to the first embodiment. An information embedding apparatus 100 includes an input receiving unit 110, a storage unit 120, an image selecting unit 130, a decoder 140, a candidate code determining unit 150, a candidate code embedding unit 160, a decode checking unit 170, and an output unit 180. The information embedding apparatus 100 receives data from an input device 200 and outputs data to an output device 300. The input device 200 is for example a scanner, and the output device 300 is, for example, a display or a printer.

While an example in which an image data group is input to the information embedding apparatus by using the input device 200 will be explained here, the image data group can be input by connecting a portable memory such as an HDD, an USB memory, or a DVD-RAM, which stores the image data group, to the information embedding apparatus 100.

The input receiving unit 110 acquires a plurality of original image data from the input device 200, in which the information is to be embedded, and allows the acquired information to be stored in the storage unit 120 as an original image data group 120a. The storage unit 120 stores the original image data group 120a.

The image selecting unit 130 selects one original image data from the original image data group 120a, and transfers the selected original image to the decoder 140. When receiving a notification notifying that the original image data is to be changed from the decode checking unit 170, the image selecting unit 130 selects an unselected image data from the original image data group 120a, and transfers the selected original image data to the decoder 140 again.

The decoder 140 acquires the original image data from the image selecting unit 130 and, as explained with reference to FIG. 1A, extracts a pseudo code based on the gray value of the original image data. The decoder 140 transfers the information of the code extracted from the original image data to the candidate code determining unit 150.

The candidate code determining unit 150 acquires the information of the code from the decoder 140, and carries out decision by majority with respect to the acquired code, to calculate a code to be embedded in the original image data (hereinafter, "candidate code"). For example, when the information of three codes of 1, 0; 1, 0; and 0, 0 (when the code is a two-digit code) is acquired, the candidate code is determined as "1, 0" by the decision by majority. The candidate code determining unit 150 transfers the calculated candidate code to the candidate code embedding unit 160.

The candidate code embedding unit 160 acquires the candidate code from the candidate code determining unit 150, acquires the selected original image data and the pseudo code information from the decoder 140 (via the candidate code determining unit 150), and embeds the candidate code in the original image data. Specifically, the candidate code embedding unit 160 compares the candidate code with the pseudo code information, to specify a different code, changes the gray value of an area (block pair) in the original image corresponding to the specified code, and embeds the candidate code in the original image data. The candidate code embedding unit 160 then transfers the image data including the candidate code embedded therein and the candidate code to the decode checking unit 170.

The decode checking unit 170 acquires the image data including the candidate code embedded therein and the candidate code from the candidate code embedding unit 160, and determines whether the candidate code is properly embedded in the image data. When the decode checking unit 170 determines that the candidate code is properly embedded in the image data, the decode checking unit 170 transfers the image data and the candidate code to the output unit 180. The output unit 180 outputs the information acquired from the decode checking unit 170 to the output device 300.

On the other hand, when the decode checking unit 170 determines that the candidate code is not properly embedded in the image data, the decode checking unit 170 transfers information indicating that the original image data is to be changed to the image selecting unit 130. It is because even when the image selecting unit 130 extracts a pseudo code from the selected image data and calculates a candidate code having good compatibility, the candidate code embedded by the candidate code embedding unit 160 can not be extracted from the image data, according to the property of the selected image data.

As the reason of the candidate code not being embedded properly in the image data, for example, there is a case that, when the code is embedded, the magnitude correlation of the mean gray value is reversed according to the respective parts of the image, due to a difference in the mean gray value of the block pair, and hence an optimum candidate code cannot be calculated with respect to the whole image data (there can be a case that even a candidate code having good compatibility with respect to a part of the image may not have good compatibility with respect to other parts of the image). Accordingly, a user of the information embedding apparatus 100 is required to store a plurality of image data in the storage unit 120, in case of a problem.

Figure 3:
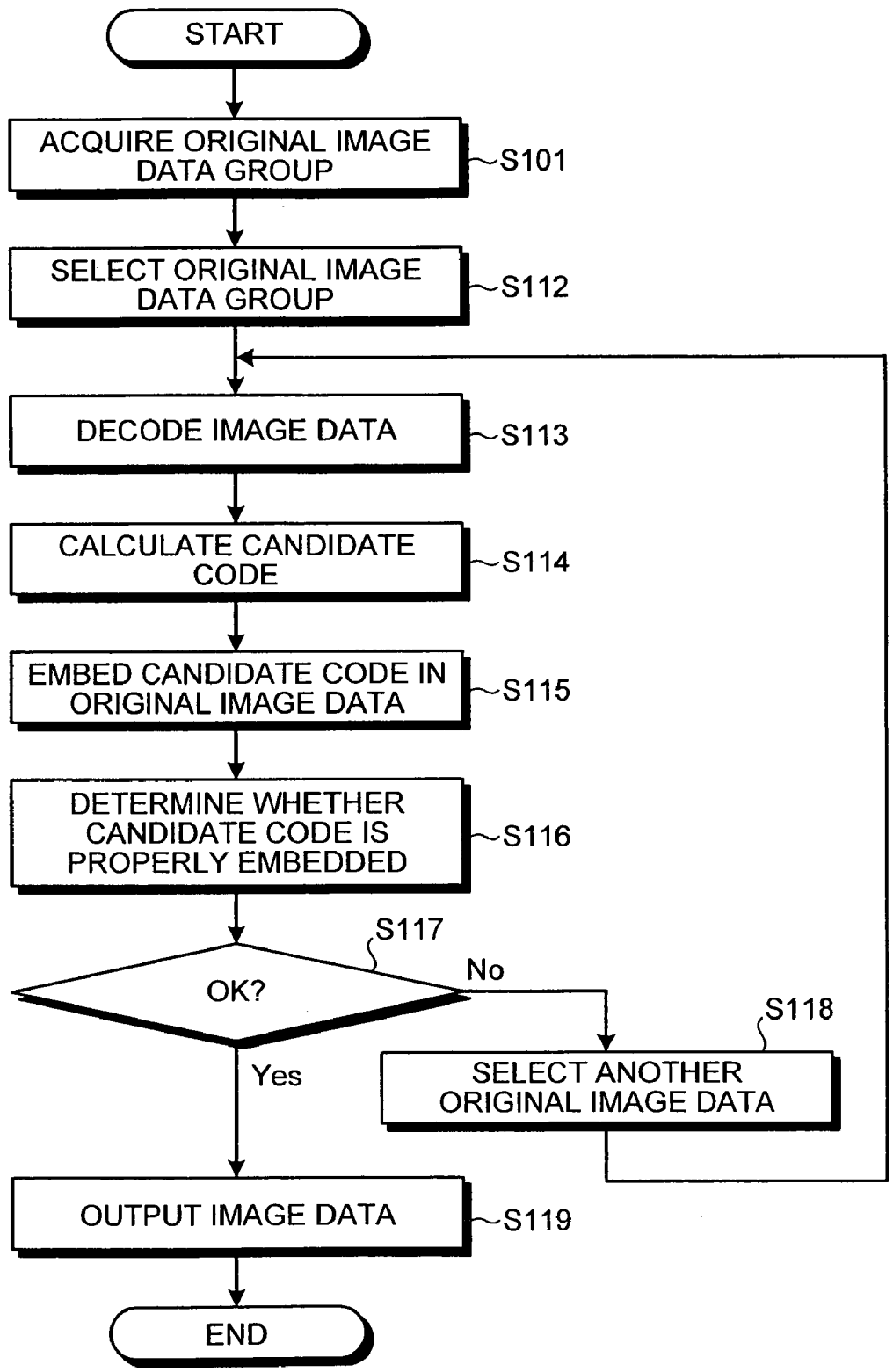
FIG. 3 is a flowchart of a process procedure performed by the information embedding apparatus shown in FIG. 2.

FIG. 3 is a flowchart of a process procedure performed by the information embedding apparatus 100. The information embedding apparatus 100 acquires the original image data from the input device 200, and stores the data in the storage unit 120 (step S101). The image selecting unit 130 then selects one original image data from the original image data group 120b (step S102).

The decoder 140 decodes the image data to detect a pseudo code (step S103), and the candidate code determining unit 104 calculates the candidate code (step S104). The candidate code embedding unit 160 then embeds the candidate code in the original image data (step S105).

Subsequently, the decode checking unit 170 determines whether the candidate code is properly embedded in the original data (step S106), when the candidate code is not properly embedded (step S107, No), the image selecting unit 130 selects another original image data from the original image data group 120a (step S108), and it proceeds to step S103.

On the other hand, when the decode checking unit 170 determines that the candidate code is properly embedded in the original image data (step S107, Yes), the output unit 180 outputs the candidate code and the original image data including the candidate code embedded therein to the output device 300 (step S109).

Thus, the candidate code determining unit 150 calculates a candidate code based on the code detected by the decoder 140, and the candidate code embedding unit 160 embeds the candidate code in the original image data. Accordingly, the code can be efficiently embedded in the original image data.

According to the information embedding apparatus 100, the image selecting unit 130 selects one original image data from the image data group 120a stored in the storage unit 120, the decoder 140 detects a code from the original image data, and the candidate code determining unit 150 calculates the candidate code. The candidate code embedding unit 160 then embeds the candidate code in the original image data, and the decode checking unit 170 determines whether the candidate code is properly embedded in the original image data. When the candidate code is not properly embedded in the original image data, the image selecting unit 130 selects an unselected original image data from the original image data group 120a, so that the candidate code corresponding to the selected original image data is embedded. Accordingly, the information can be efficiently embedded in the original image data desired by the user.

The information embedding apparatus 100 determines the candidate code by the decision by majority among the codes detected from the original image data and the candidate code is embedded in the original image data. Accordingly, number of changes in the original image data can be reduced, thereby preventing image degradation. That is, degradation of the image quality of the original image data can be reduced as much as possible, thereby enabling reliable encoding in the original image data.

The use of the image data in which the code is embedded by the information embedding apparatus 100 will be explained here. As the use of the image data including the code embedded therein, the user can easily access the contents on a network by using a management server that stores the code embedded in the image data and a uniform resource locator (URL) in association with each other.

That is, the user acquires the image data by using a portable terminal (a mobile phone or the like) with a camera, extracts the code from the image data by using a program distributed by a contents provider, and transmits the extracted code to the management server. When having received the code from the portable terminal, the management server converts the acquired code to a corresponding URL and notifies the portable terminal of the URL. Accordingly, the user can easily access the desired contents without inputting a complicated URL to the portable terminal.

Furthermore, when the contents provider appropriately selects the image data in which the code is to be embedded, the user can easily get association of contents from the image data. Accordingly, a user friendly mechanism can be realized.

The characteristics of an information embedding apparatus according to a second embodiment of the present invention will be explained next. FIG. 4 is a schematic for explaining the characteristics of the information embedding apparatus according to the second embodiment. The information embedding apparatus according to the second embodiment detects a pseudo code from the original image data and calculates a candidate code based on the detected code. This is same as in the first embodiment.

The information embedding apparatus according to the second embodiment embeds the candidate code in the original image data, and determines whether the candidate code is properly embedded. When the candidate code is not properly embedded, as shown in FIG. 4, performs processing such as blurring or framing (hereinafter, "modification processing") with respect to the selected original image data, and embeds the candidate code again in the image data subjected to the modification processing.

When the candidate code is not properly embedded in the original image data, the information embedding apparatus according to the second embodiment modifies the original image data, and embeds the candidate code therein again. Accordingly, the code can embedded in the original image data desired by the user regardless of the characteristic of the original image data.

Figure 5:
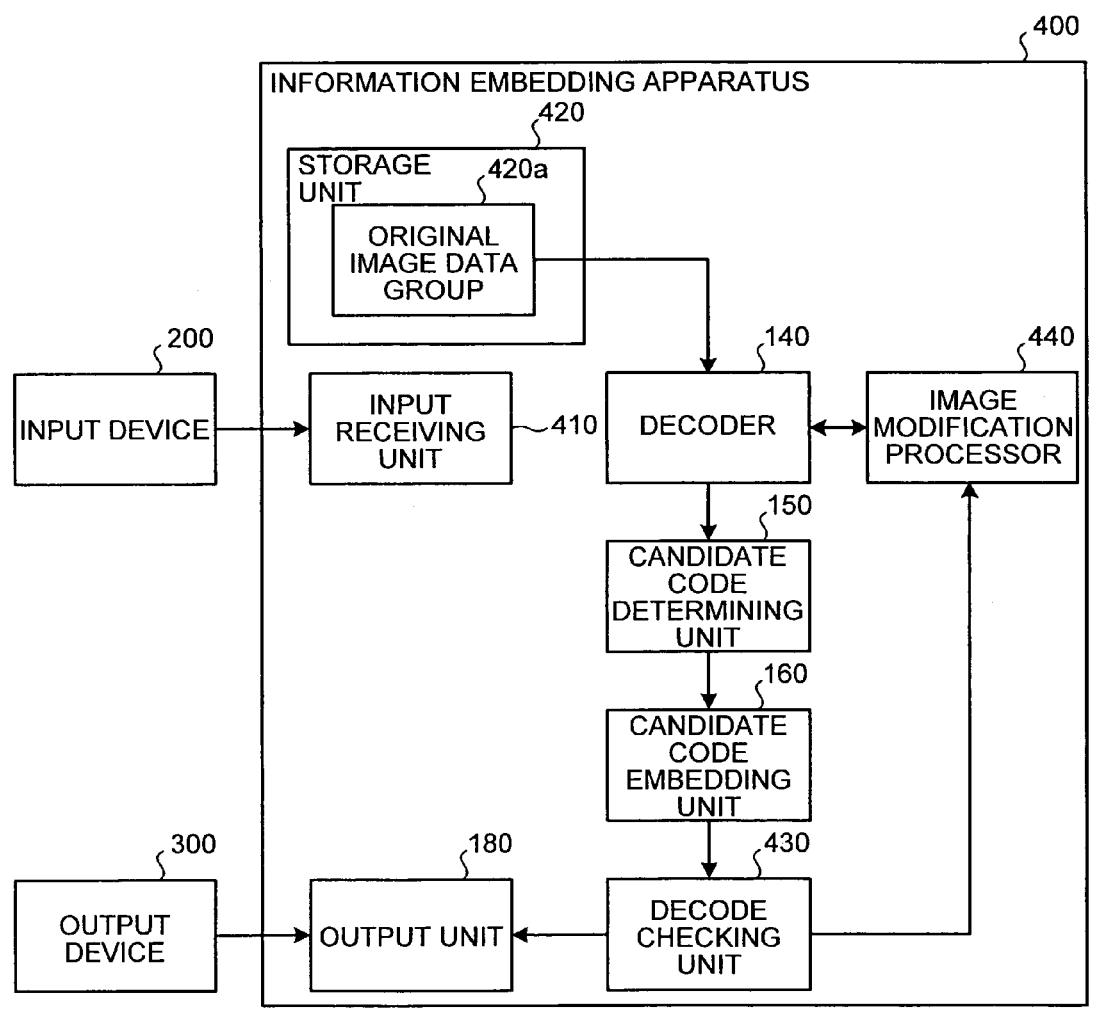
FIG. 5 is a functional block diagram of the information embedding apparatus shown in FIG. 4.

FIG. 5 is a functional block diagram of the information embedding apparatus according to the second embodiment. An information embedding apparatus 400 includes an input receiving unit 410, a storage unit 420, a decode checking unit 430, and an image modification processor 440. Since the other configuration and components are the same as those of the information embedding apparatus 100 shown in the first embodiment, like reference signs are used to refer to like parts and explanation thereof is omitted. The information embedding apparatus 400 is connected to the input device 200 and the output device 300 as in the first embodiment.

The input receiving unit 410 acquires the original image data in which the information is to be embedded, and stores the acquired information in the storage unit 420. The storage unit 420 stores the original image data 420.

The decode checking unit 430 acquires the image data including the candidate code embedded therein and the candidate code from the candidate code embedding unit 160, and determines whether the candidate data is properly embedded in the image data. When having determined that the candidate data is properly embedded in the image data, the decode checking unit 430 transfers the image data and the candidate code to the output unit 180.

On the other hand, when having determined that the candidate code is not properly embedded in the image data, the decode checking unit 430 transfers information indicating that the original image data is to be modified to the image modification processor 440.

When the image modification processor 440 acquires the information indicating that the original image data is to be modified from the decode checking unit 430, the image modification processor 440 acquires the original image data from the decoder 140 and modifies the acquired original image data. Specifically, when modifying the original image data, the image modification processor 440 uses, for example, a low pass filter or a high pass filter to shade off the original image data, superpose a specific pattern on the original image data (the original image is not ruined), overwrite a specific pattern on the original image data (the original image is ruined), or frame the original image data. By adding such modification, a portion of the image data where it is difficult to embed the candidate code can be removed, and by embedding the candidate code again in the modified image data, the candidate code can be properly extracted from the image data.

For example, when the candidate code cannot be properly embedded in a complicated portion of the image data, the low pass filter is used to remove the complicated portion of the image data. Accordingly, the candidate code can be properly embedded in the image data in which it is difficult to embed the candidate code.

The image modification processor 440 transfers the image data obtained by adding modification to the original image data to the decoder 140, and the decoder 140, the candidate code determining unit 150, the candidate code embedding unit 160, and the decode checking unit 430 repeat the processing.

Figure 6:
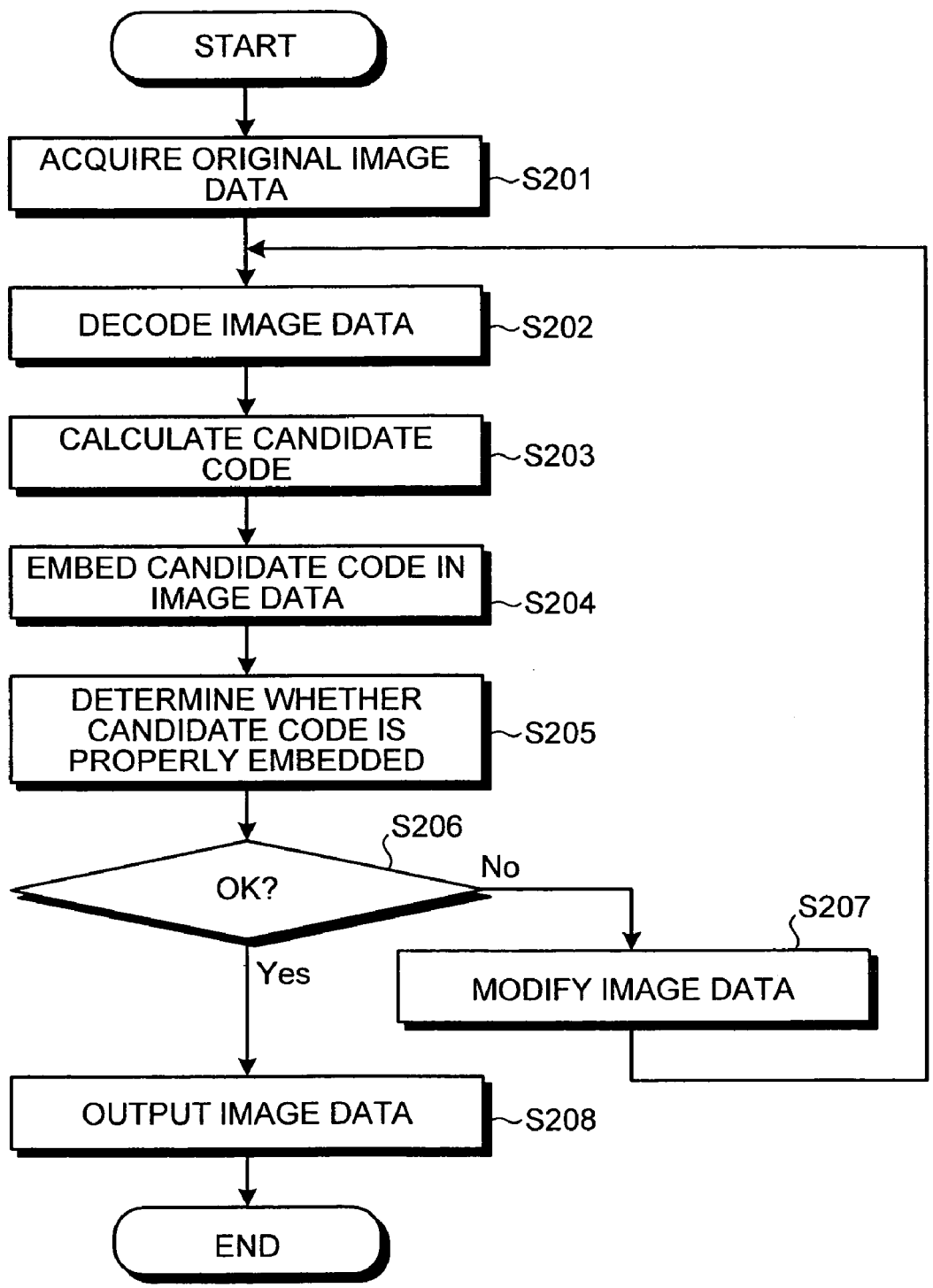
FIG. 6 is a flowchart of a process procedure performed by the information embedding apparatus shown in FIG. 4.

Process procedure performed by the information embedding apparatus 400 will be explained. FIG. 6 is a flowchart of a process procedure performed by the information embedding apparatus 400. The input receiving unit 410 acquires the original image data from the input device 200 and stores the original image data in the storage unit 420 (step S201), the decoder 140 decodes the original image to detect a pseudo code (step S202).

The candidate code determining unit 150 calculates the candidate code based on the code detected by the decoder 140 (step S203), and the candidate code embedding unit 160 embeds the candidate code in the original image data (step S204).

The decode checking unit 430 then determines whether the candidate code is properly embedded in the original image data (step S205). When the candidate code is not properly embedded (step S206, No), the image modification processor 440 modifies the original image data and transfers the modified image data to the decoder 140 (step S207), and it proceeds to step S202.

On the other hand, when the decode checking unit 170 determines that the candidate code is properly embedded in the original image data (step S206, Yes), the output unit 180 outputs the candidate code and the original image data including the candidate code embedded therein to the output device 300 (step S208).

Thus, when the decode checking unit 430 determines that the candidate code is not properly embedded in the original image data, the image modification processor 440 modifies the original image data and embeds again the candidate code in the modified image data. Accordingly, the candidate code can be embedded in the original data desired by the user, regardless of the characteristic of the image.

According to the information embedding apparatus 400, the decoder 140 detects a code from the original image data, and the candidate code determining unit 150 calculates a candidate code. The candidate code embedding unit 160 then embeds the candidate code in the original image data, and the decode checking unit 430 determines whether the candidate code is properly embedded in the original image data. When the candidate code is not properly embedded in the original image data, the image modification processor 440 modifies the original image data and embeds the candidate code in the modified image data. Accordingly, the candidate date can be efficiently embedded in the original image data desired by the user, regardless of the characteristic of the image.

The characteristics of an information embedding apparatus according to a third embodiment will be explained below. The information embedding apparatus according to the third embodiment acquires the original image data and a code to be embedded in the original image data (hereinafter, "embedded code") from the input device and embeds the embedded code in the original image data.

The information embedding apparatus according to the third embodiment determines whether the embedded code is properly embedded in the original image data. When the embedded code is not properly embedded, the information embedding apparatus modifies the original image data as explained in the second embodiment, and then embeds again the embedded code in the modified image data.

Thus, the information embedding apparatus according to the third embodiment modifies the original image data when the embedded code is not properly embedded in the original image, and embeds the embedded code again. Accordingly, the embedded code desired by the user can be embedded in the original image data desired by the user, regardless of the characteristic of the image.

Figure 7:
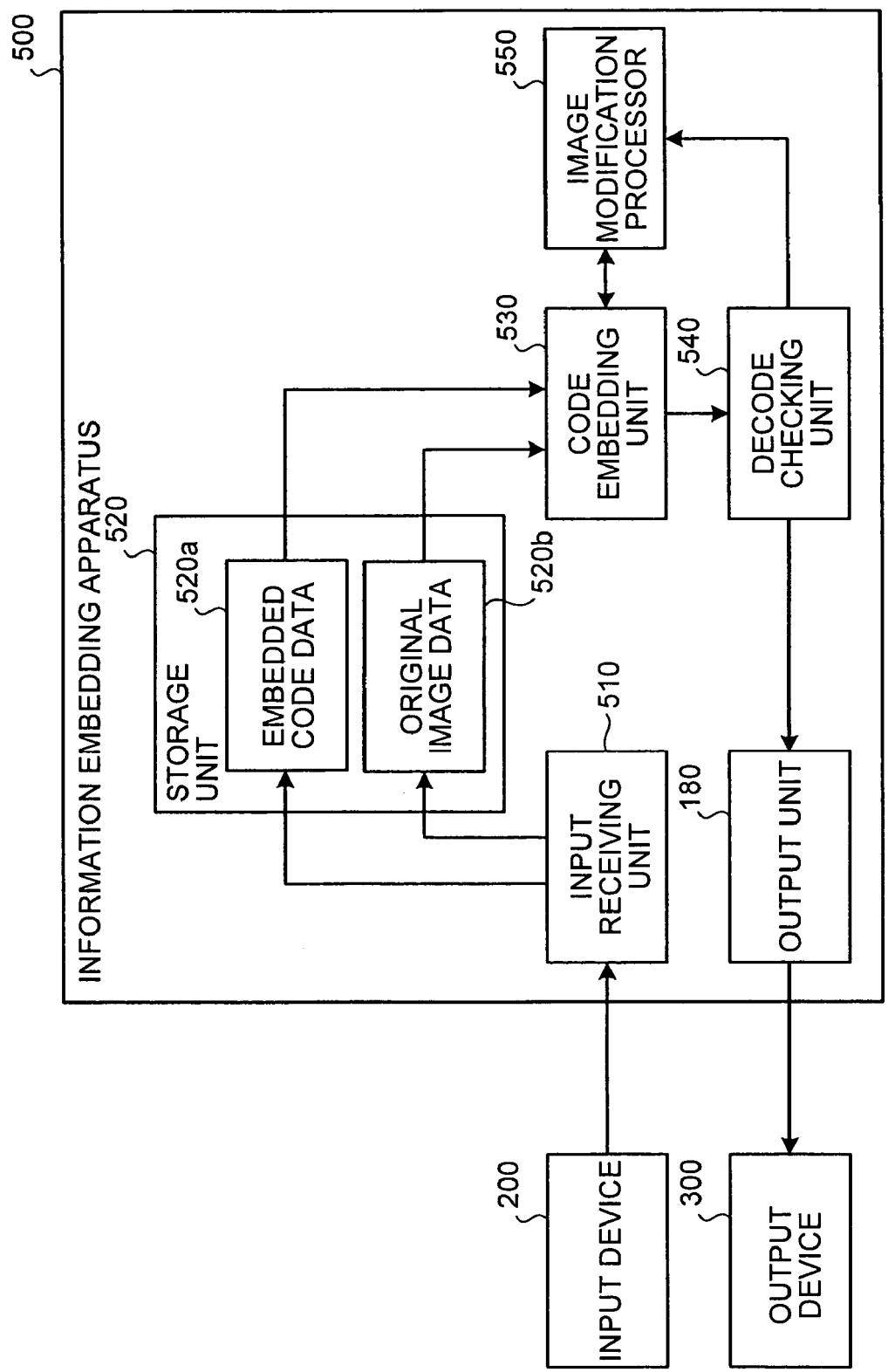
FIG. 7 is a functional block diagram of an information embedding apparatus according to a third embodiment of the present invention.

FIG. 7 is a functional block diagram of the information embedding apparatus according to the third embodiment. An information embedding apparatus 500 includes an input receiving unit 510, a storage unit 520, a code embedding unit 530, a decode checking unit 540, and an image modification processor 550. The other configuration and components are the same as those of the information embedding apparatus 100 shown in the first embodiment, and hence, like reference signs are used to refer to like parts and explanation thereof is omitted.

The input receiving unit 510 acquires the original image data in which information is to be embedded, and embedded code data from the input unit 200, and stores acquired respective pieces of information in the storage unit 520. The storage unit 520 stores embedded code data 520a and original image data 520b.

The code embedding unit 530 acquires the embedded code data 520a and the original image data 520b from the storage unit 520, and embeds the embedded code data 520a in the original image data 520b. As the method by which the code embedding unit 530 embeds the embedded code data in the original image data 520a, for example, the same method used by the candidate code embedding unit 160 in FIG. 2 can be used. The code embedding unit 530 transfers the image data in which the embedded code is embedded in the original image data 520b to the decode checking unit 540.

When having acquired the image data from the image modification processor 550 (explained later), the code embedding unit 530 embeds the embedded code in the acquired image data and transfers the image data including the embedded code embedded therein to the decode checking unit 540.

The decode checking unit 540 acquires the image data including the embedded code embedded therein and the embedded code data 520a from the code embedding unit 530, and determines whether the embedded code is properly embedded in the image data. When having determined that the embedded code is properly embedded in the image data, the decode checking unit 540 transfers the image data and the embedded code data 520a to the output unit 180.

On the other hand, when having determined that the embedded code is not properly embedded in the image data, the decode checking unit 540 transfers information indicating that the original image data is to be modified to the image modification processor 550.

When having acquired the information indicating that the original image data is to be modified from the decode checking unit 540, the image modification processor 550 acquires the original image data 520b from the code embedding unit 530 and modifies the acquired original image data. Specifically, when modifying the original image 520b, the image modification processor 550 uses, for example, a low pass filter or a high pass filter to shade off the original image data, superpose a specific pattern on the original image data (the original image is not ruined), overwrite a specific pattern on the original image data (the original image is ruined), or frame the original image data.

The image modification processor 550 then transfers the image data obtained by modifying the original image data 520b to the code embedding unit 530.

Figure 8:
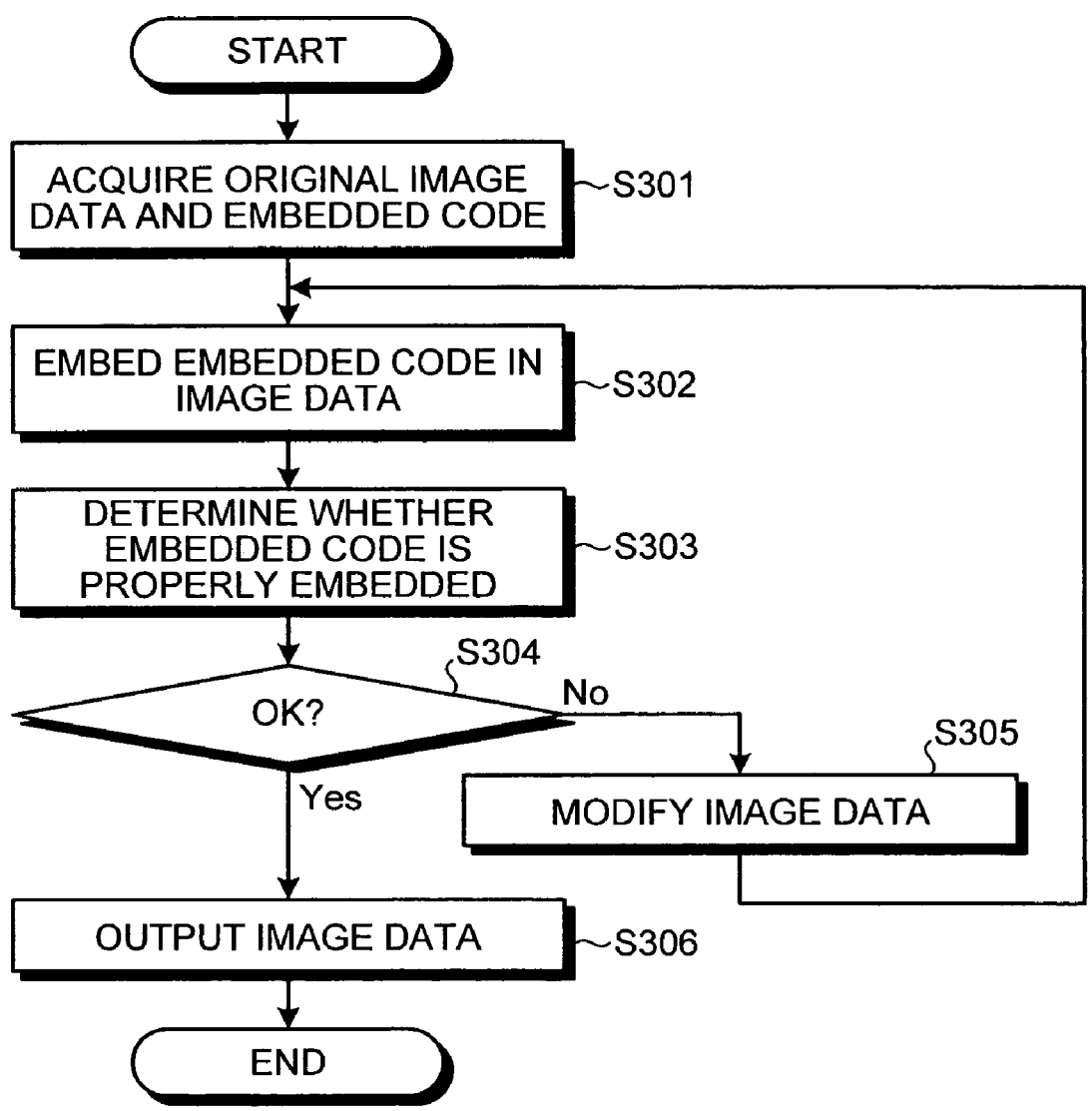
FIG. 8 is a flowchart of a process procedure performed by the information embedding apparatus shown in FIG. 7.

Process procedure performed by the information embedding apparatus 500 will be explained. FIG. 8 is a flowchart of a process procedure performed by the information embedding apparatus 500. The input receiving unit 510 acquires the embedded code data and the original image data from the input device 200, and stores the embedded code data 520a and the original image data 520b in the storage unit 520 (step S301). The code embedding unit 530 embeds the embedded code in the original image data 520b (step S302).

The decode checking unit 540 determines whether the embedded code is properly embedded in the image data (step S303), and when the embedded code is not properly embedded (step S304, No), the image modification processor 550 modifies the original image data 520b and transfers the modified image data to the code embedding unit 530 (step S305), and it proceeds to step S302.

On the other hand, when the decode checking unit 540 determines that the embedded code is properly embedded in the image data (step S304, Yes), the output unit 180 outputs the embedded code and the image data including the embedded code embedded therein to the output device 300 (step S109).

In this manner, when the decode checking unit 540 determines that the embedded code is not properly embedded in the image data, the image modification processor 550 modifies the original image data, and the code embedding unit 530 embeds the embedded code in the modified image data. Accordingly, the code desired by the user can be embedded in the original data desired by the user.

According to the information embedding apparatus 500, the code embedding unit 530 embeds the embedded code in the original image data 520b, the decode checking unit 540 determines whether the embedded code is properly embedded in the original image data. When the embedded code is not properly embedded, the image modification processor 550 modifies the original image data, and embeds the embedded code in the modified image data. Accordingly, the embedded code can be efficiently embedded, regardless of the characteristic of the original image data.

When the embedded code is not properly embedded in the original image data 520b, it is explained above that the image modification processor 550 modifies the original image data. However, when a plurality of original image data is stored in the storage unit 520 beforehand and the embedded code is not properly embedded in the original image data, the code embedding unit 530 can embed another embedded code again in another original image data.

Figure 9:
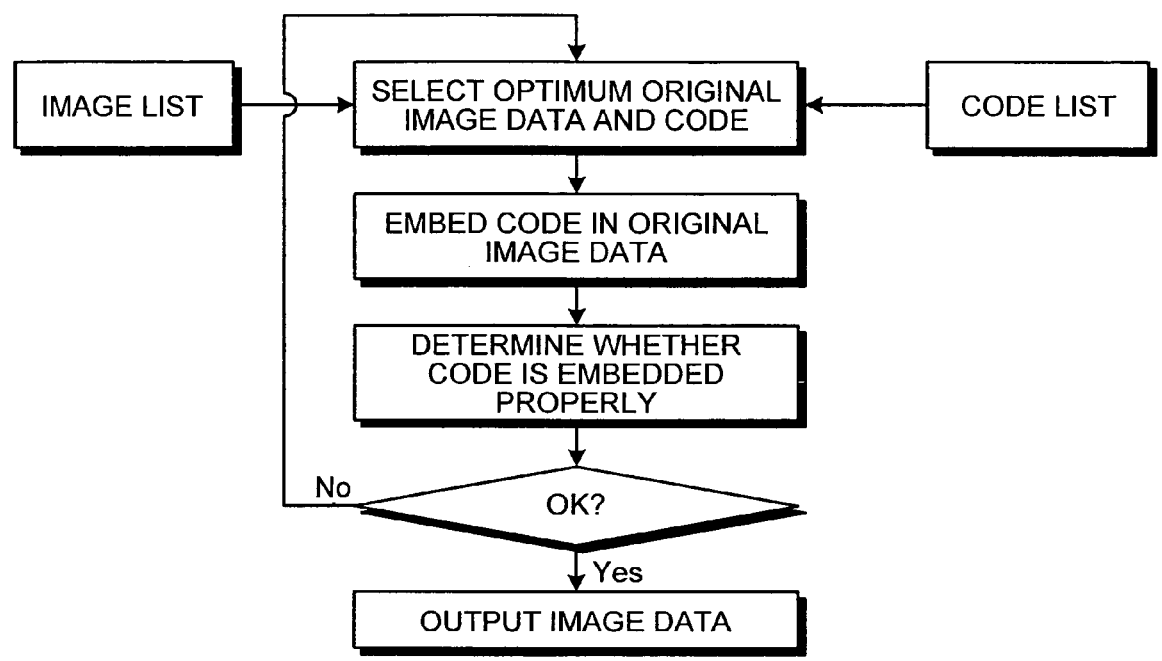
FIG. 9 is a schematic for explaining an example of application of the present invention.

An example of application of the present invention will be explained now. FIG. 9 is an explanatory diagram of the application example of the present invention. An information embedding apparatus according to any of the above embodiments can be used here. The information embedding apparatus acquires an original image data group (image list) in which information is to be embedded and a list of codes to be embedded in the original image data (code list), and decodes the respective original image data.

The information embedding apparatus compares the respective decode results relating to the respective original image data with the respective codes included in the code list, to select an optimum combination of the original image data and the code. Any method can be used here as the selection method for selecting the optimum combination. A code closest to the decode result of the original image data can be selected as a code to be paired with the image data.

For example, when the code of the respective original image data is (1,0,0) and (1,1,0) and the code included in the code list is (1,1,1), (1,0,1), (0,0,0) and (0,1,1), the decision by majority is carried out for each code at respective positions. Accordingly of decision by majority, the code closest to the image data having the code (1,0,0) is the code (0,0,0) (matching at two positions), and the code closest to the image data having the code (1,1,0) is the code (1,1,1) (matching at two positions).

A pair of image data and the code having the largest matching positions is selected among the optimum combinations, and the code is embedded in the image data. When there is a plurality of pairs having the same number of matching positions, one pair is selected at random.

Subsequently, it is determined whether the code is properly embedded in the image data in the selected pair. When the code is properly embedded, the information of the image data having the code embedded therein and the code is output. When the code is not properly embedded, another combination of the original image data and the code is selected, to embed the code in the original image data.

The reason of the information being not properly embedded in the image data in spite of selecting the optimum pair is that the optimum pair is selected by comparing the "decode results" of the image data with the codes in the code list, however, the decode result does not always have good compatibility with the image data. That is, the numerical value of the code decoded from the image data is determined according to decision by majority, however, various codes are intermingled together according to the image data, and the compatibility of the respective codes can have almost equal power.

In the combination of the image data and the code, therefore, the code may not be properly embedded in the image data, though an optimum pair is selected. Accordingly, a pair of the image data and the code in another combination is selected, to embed the code in the image data again.

Thus, the information embedding apparatus acquires the image list and the code list, to select an optimum combination of the original image data and the code, and embeds the code in the original image data. Accordingly, the code can be embedded efficiently and properly in the original image data.

Figure 10:
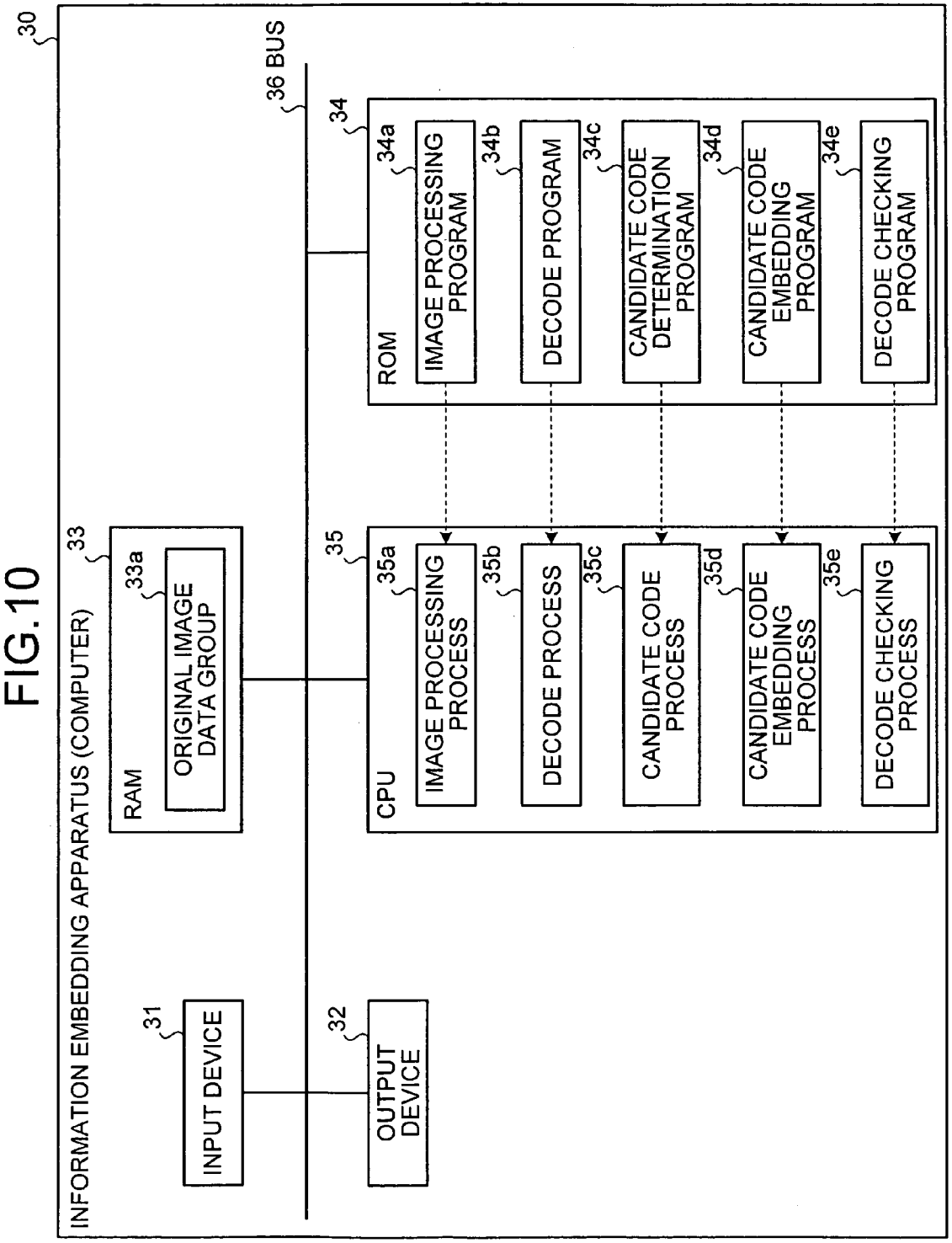
FIG. 10 is a functional block diagram of a computer on which methods according to the embodiments can be implemented.

The process procedures explained in the above embodiments can be implemented of a computer by executing a computer program. An example of a computer that can implement the process procedures will be explained here. FIG. 10 is a functional block diagram of such a computer.

A computer 30 includes an input device 31, an output device 32, a RAM 33, a ROM 34, and a CPU 35 by a bus 36. The input unit 31 and the output unit 32 respectively correspond to the input device 200 and the output device 300.

An information embedding program exhibiting the same function as that of the information embedding apparatus in the embodiments, that is, as shown in FIG. 10, an image processing program 34a, a decode program 34b, a candidate code determination program 34c, a candidate code embedding program 34d, and a decode checking program 34e are stored in advance in the ROM 34.

The CPU 35 reads these programs 34a to 34e from the ROM 34 and executes these programs. Accordingly, as shown in FIG. 10, the respective programs 34a to 34e function as an image processing process 35a, a decode process 35b, a candidate code process 35c, a candidate code embedding process 35d, and a decode checking process 35e. The respective processes 35a to 35e respectively correspond to the image selecting unit 130, the decoder 140, the candidate code determining unit 150, the candidate code embedding unit 160, and the decode checking unit 170.

The CPU 35 selects the original image data from the original image data group 33a stored in the RAM 33, to calculate a candidate code from the selected original image data, and embeds the candidate code in the original image data.

The respective programs 34a to 34e are not always necessary to be stored in the ROM 34 from the initial stage, and for example, the respective programs can be stored in a "portable physical medium" such as a flexible disk (FD), a CD-ROM, an MO disk, a DVD disk, a magneto-optical disk, and an IC card inserted into the computer 30, or in a "fixed physical medium" such as a hard disk drive (HDD) equipped inside or outside of the computer 30, or in "another computer (or server)" connected to the computer 30 via a public line, the Internet, LAN or WAN, and the computer 30 can read and execute the respective programs.

An information embedding apparatus according to a fourth embodiment of the present invention modifies a tome of the original image as shown in FIG. 11.

According to the present invention, the information embedding apparatus extracts a feature quantity from image data, calculates a code from the extracted feature quantity, and embeds information in the image data after changing the feature quantity of the image data so as to correspond to the calculated code. Accordingly, the information can be embedded in the image without causing image degradation.

Furthermore, the information embedding apparatus extracts a feature quantity from the image data, whose feature quantity has been changed, determines whether the code corresponding to the extracted feature quantity matches with a code calculated before embedding, modifies the image data based on the determination result, and embeds a corresponding code in the modified image again. Accordingly, information can be embedded in the image data desired by a user, regardless of the characteristic of the image.

When modifying the image data, the information embedding apparatus removes a predetermined frequency component with respect to the image data. Accordingly, information can be embedded properly in the changed image data.

When modifying the image data, the information embedding apparatus superposes a specific pattern on the image data. Accordingly, information can be embedded properly in the changed image data.

The information embedding apparatus acquires a plurality of codes and an image data group, extracts the feature quantity of the acquired image data group respectively, and extracts a combination of image data and a code, in which information can be easily embedded, based on the extracted feature quantities and the codes. Furthermore, the information embedding apparatus embeds information after changing the feature quantity of the image data to be combined with the code, so as to correspond to the extracted code. Accordingly, information can be embedded in the image data efficiently and properly.

An image in which the information is embedded by the information embedding apparatus according to any one of the above embodiments is printed on the printed material according to the present invention, and hence, degradation in image quality can be prevented.

According to the information embedding program of the present invention, a feature quantity is extracted from image data, a code to be embedded in the image data is calculated based on the extracted feature quantity, and information is embedded in the image data after changing the feature quantity of the image data so as to correspond to the calculated code. Accordingly, the information can be embedded in the image without causing image degradation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information embedding apparatus that embeds information in image data, comprising:
   a code calculator that extracts a feature quantity from the image data, and calculates a code from extracted feature quantity;
   an information embedding unit that changes the extracted feature quantity in accordance with calculated code and embeds the changed feature quantity in the image data;
   a determining unit that extracts the feature quantity embedded in the image data and determines whether a code corresponding to the extracted feature quantity matches with the code calculated by the code calculator; and
   a modification unit that modifies the image data, based on the determination result of the determining unit, wherein
   when the modification unit modifies the image data, the code calculator extracts a feature quantity from modified image data and calculates a code from extracted feature quantity, and the information embedding unit changes the extracted feature so as to correspond to calculated code and embeds the changed feature quantity in the image data.

2. The information embedding apparatus according to claim 1, wherein the modification unit is a filter configured to remove a predetermined frequency component from the image data.

3. The information embedding apparatus according to claim 2, wherein the modification unit is a low pass filter.

4. The information embedding apparatus according to claim 1, wherein the modification unit superposes a specific pattern on the image data.

5. The information embedding apparatus according to claim 1, wherein the modification unit overwrites a specific pattern on the image data.

6. The information embedding apparatus according to claim 1, wherein the modification unit modifies tone of the image data.

7. A printed material having an image printed thereon using an image data embedded with information by an information embedding apparatus that includes
   a code calculator that extracts a feature quantity from the image data, and calculates a code from extracted feature quantity;

an information embedding unit that changes the extracted feature quantity in accordance with calculated code and embeds the changed feature quantity in the image data;
a determining unit that extracts the feature quantity embedded in the image data and determines whether a code corresponding to the extracted feature quantity matches with the code calculated by the code calculator; and
a modification unit that modifies the image data, based on the determination result of the determining unit, wherein
when the modification unit modifies the image data, the code calculator extracts a feature quantity from modified image data and calculates a code from extracted feature quantity, and the information embedding unit changes the extracted feature so as to correspond to calculated code and embeds the changed feature quantity in the image data.

8. A computer-readable recording medium that stores therein a computer program that implements a method of embedding information in image data on a computer, the computer program causing the computer to execute:
extracting a feature quantity from the image data;
calculating a code from extracted feature quantity;
changing the extracted feature quantity in accordance with calculated code;
embedding the changed feature quantity in the image data;
extracting the feature quantity embedded in the image data;
determining whether a code corresponding to the extracted feature quantity matches with the code calculated at the calculating; and
modifying the image data, based on a result of the determining, wherein
when the image data is modified at the modifying, the extracting includes extracting a feature quantity from modified image data, the calculating includes calculating a code from extracted feature quantity, the changing includes changing the extracted feature so as to correspond to calculated code, and the embedding the changed feature quantity in the image data.

9. The computer-readable recording medium according to claim 8, wherein the modifying includes filtering out a predetermined frequency component from the image data.

10. A method of an information embedding apparatus that embeds information in image data, the method comprising:
extracting a feature quantity from the image data;
calculating a code from extracted feature quantity;
changing the extracted feature quantity in accordance with calculated code;
embedding the changed feature quantity in the image data;
extracting the feature quantity embedded in the image data;
determining whether a code corresponding to the extracted feature quantity matches with the code calculated at the calculating; and
modifying the image data, based on a result of the determining, wherein
when the image data is modified at the modifying, the extracting includes extracting a feature quantity from modified image data, the calculating includes calculating a code from extracted feature quantity, the changing includes changing the extracted feature so as to correspond to calculated code, and the embedding the changed feature quantity in the image data.

11. The method according to claim 10, wherein the modifying includes filtering out a predetermined frequency component from the image data.

12. The method according to claim 10, wherein at least one of the extracting the feature quantity, calculating the code, changing the extracted feature quantity, embedding the changed feature quantity and determining are performed by a processor.

* * * * *